United States Patent
Sexton et al.

(10) Patent No.: US 9,309,378 B2
(45) Date of Patent: *Apr. 12, 2016

(54) EMULSION COMPOSITIONS COMPRISING POLYACRYLAMIDE COPOLYMER AND ETHYLENE OXIDE—PROPYLENE OXIDE COPOLYMER

(75) Inventors: Franklin E. Sexton, Richmond, IL (US); Todd J. O'Connell, Wonder Lake, IL (US); Ryan T. Strash, Trevor, WI (US)

(73) Assignee: Exacto, Inc., Sharon, WI (US)

( * ) Notice: Subject to any disclaimer, the term of this patent is extended or adjusted under 35 U.S.C. 154(b) by 73 days.

This patent is subject to a terminal disclaimer.

(21) Appl. No.: 13/091,686

(22) Filed: Apr. 21, 2011

(65) Prior Publication Data

US 2013/0231429 A1    Sep. 5, 2013

Related U.S. Application Data

(63) Continuation-in-part of application No. 12/487,710, filed on Jun. 19, 2009.

(51) Int. Cl.

| | |
|---|---|
| *C08K 5/09* | (2006.01) |
| *C08L 53/00* | (2006.01) |
| *C09K 17/00* | (2006.01) |
| *C08L 33/26* | (2006.01) |
| *C08L 91/00* | (2006.01) |
| *C08K 5/00* | (2006.01) |
| *C08K 5/06* | (2006.01) |
| *C08K 5/101* | (2006.01) |

(52) U.S. Cl.
CPC . *C08K 5/09* (2013.01); *C08L 33/26* (2013.01); *C08L 91/00* (2013.01); *C08K 5/0058* (2013.01); *C08K 5/06* (2013.01); *C08K 5/101* (2013.01)

(58) Field of Classification Search
CPC ........................................................ C08K 5/09
USPC ........................................................... 523/132
See application file for complete search history.

(56) References Cited

U.S. PATENT DOCUMENTS

| | | | |
|---|---|---|---|
| 3,346,494 A | 10/1967 | Robbins et al. | |
| 3,624,019 A | 11/1971 | Anderson et al. | |
| 4,052,353 A | 10/1977 | Scanley | |
| 4,413,087 A | 11/1983 | Bernot | |
| 4,681,912 A | 7/1987 | Durand et al. | |
| 4,696,962 A | 9/1987 | Danner et al. | |
| 4,904,695 A * | 2/1990 | Bell | 514/521 |
| 4,915,859 A | 4/1990 | Kerr et al. | |
| 4,956,399 A | 9/1990 | Kozakiewicz et al. | |
| 5,037,653 A * | 8/1991 | Dawson | 424/405 |
| 5,037,654 A | 8/1991 | Puritch et al. | |
| 5,292,800 A | 3/1994 | Moench et al. | |
| 5,490,943 A | 2/1996 | Eicken et al. | |
| 5,549,840 A | 8/1996 | Mondin et al. | |
| 5,587,357 A | 12/1996 | Rhinesmith | |
| 5,656,289 A | 8/1997 | Cho et al. | |
| 5,763,530 A | 6/1998 | Chen et al. | |
| 5,811,383 A | 9/1998 | Klier et al. | |
| 5,952,398 A * | 9/1999 | Dietz et al. | 522/184 |
| 6,025,432 A * | 2/2000 | Ryan | 524/555 |
| 6,110,981 A | 8/2000 | Davies et al. | |
| 6,143,830 A | 11/2000 | Utz et al. | |
| 6,172,031 B1 * | 1/2001 | Stevens | 510/417 |
| 6,326,013 B1 * | 12/2001 | Lemann et al. | 424/401 |
| 6,410,605 B1 * | 6/2002 | Shimada et al. | 516/22 |
| 6,475,974 B1 * | 11/2002 | Leboucher et al. | 510/417 |
| 6,686,417 B1 | 2/2004 | Reekmans et al. | |
| 6,709,716 B2 * | 3/2004 | Uy et al. | 427/505 |
| 6,803,345 B2 | 10/2004 | Herold et al. | |
| 6,835,761 B2 | 12/2004 | Harrison | |
| 7,074,752 B2 | 7/2006 | Gordon | |
| 2003/0147825 A1 * | 8/2003 | Chiarelli et al. | 424/70.11 |
| 2004/0194658 A1 * | 10/2004 | Konno et al. | 106/31.26 |
| 2005/0101510 A1 | 5/2005 | Mondin et al. | |
| 2005/0118210 A1 * | 6/2005 | Kachi et al. | 424/401 |
| 2005/0234166 A1 * | 10/2005 | Lau | 524/211 |

(Continued)

FOREIGN PATENT DOCUMENTS

| | | |
|---|---|---|
| CN | 101933509 A | 1/2011 |
| KR | 20000068408 A | 11/2000 |

(Continued)

OTHER PUBLICATIONS

Applied Polymer systems, Inc., APS 600 Series Silt Stop, Applied Polymer Systems, Inc., 2002, 2 pages, http://www.siltstop.com/silt_stop_aps_600.html.

Lentz et al., "Field REsults Using Polyacrylamide to Manage Furrow Erosion and Infiltration", Soil Science, Oct. 1994, vol. 158, Issue 4, Abstract http://journals.lww.com/soilsci/Abstract/1994/10000/FIELD_RESULTS_USING_POLYACRYLAMIDE_TO_MANAGE.7.aspx.

Polyacrylamide (PAM) Definition, pp. PM-1-PM-5. http://www.michigan.gov/documents/deq/nps-polyacrylamide_332130_7.pdf, Feb. 12, 2010.

Flick, E.W., Cosmetic Additives—An Industrial Guide, 1991, William Andrew Pubilshing/Noyes, p. 401, 412.

Flick, E.W., Industrial Surfactants, 1993, Noyles Publications, Second Edition, p. 240.

International Search Report, PCT/US2013/034468, Dec. 16, 2013, 3 pages.

*Primary Examiner* — David Karst

(74) *Attorney, Agent, or Firm* — Berenato & White, LLC

(57) ABSTRACT

A polyacrylamide-based composition as a microemulsion is provided in the form of a water-in-oil microemulsion with polyacrylamide dissolved in the water phase, and further comprising ethylene oxide-propylene oxide block copolymer. Specifically, the present invention includes, dissolved in the water phase, a polyacrylamide copolymer and an EO/PO block copolymer, with the water phase mixed with an oil phase. Preferably, the present invention may further comprise the presence of at least one fatty acid and/or at least one nonionic surfactant to stabilize the microemulsion. In addition, the present invention may further comprise effective amount of other components, such as pesticides and/or fertilizers, that may be delivered to trees, plants or other vegetation.

21 Claims, No Drawings

(56) References Cited

U.S. PATENT DOCUMENTS

| | | |
|---|---|---|
| 2005/0239957 A1 | 10/2005 | Pillsbury et al. |
| 2006/0004130 A1 | 1/2006 | Strominger et al. |
| 2006/0289137 A1* | 12/2006 | Gelman et al. ............. 162/168.3 |
| 2007/0049496 A1 | 3/2007 | Messerschmidt et al. |
| 2007/0197418 A1* | 8/2007 | Rahse .......................... 510/407 |
| 2007/0219315 A1 | 9/2007 | Braun |
| 2010/0037513 A1 | 2/2010 | Petrucci et al. |
| 2014/0323312 A1 | 10/2014 | Sexton et al. |
| 2014/0323609 A1 | 10/2014 | Sexton et al. |
| 2014/0378554 A1 | 12/2014 | Sexton et al. |

FOREIGN PATENT DOCUMENTS

| | | |
|---|---|---|
| WO | 8810274 A1 | 12/1988 |
| WO | 2005077336 A1 | 8/2005 |

* cited by examiner

EMULSION COMPOSITIONS COMPRISING POLYACRYLAMIDE COPOLYMER AND ETHYLENE OXIDE—PROPYLENE OXIDE COPOLYMER

The present invention claims priority as a continuation-in-part of U.S. patent application Ser. No. 12/487,710, entitled "Polyacrylamide Based Agricultural Compositions" filed Jun. 19, 2009, the entirety of which is incorporated herein in its entirety.

TECHNICAL FIELD

The present invention relates to polyacrylamide-based compositions, and more particularly, to polyacrylamide-based compositions as microemulsions. More specifically, the present invention relates to compositions comprising polyacrylamide and EO/PO block copolymer, such as polyacrylamide and EO/PO block copolymer microemulsions in oil, such as in modified seed oil.

BACKGROUND

Water-soluble polymers are long known to be very useful in both agricultural and industrial applications. Among the polymers that are extremely well-known, belongs the class of water-soluble polymers known as linear polyacrylamides. These are useful because of their superior properties of infinite solubility and low use rates, among others. By far, the major use for linear polyacrylamides is in the treatment of water, especially wastewater.

In wastewater treatment and uses like canal sealing, polyacrylamide causes flocculation, or agglomeration of fine particles. This flocculation, where relatively light particles are attracted together to form heavier particles, causes them to sink rather than float, clarifying the water containing the particles. In agricultural sprays, the ability of these polymers to attract and retain water and add viscosity is utilized to enhance the effectiveness of the sprays, in addition to other purposes.

These linear polyacrylamides are commonly available in three commercial forms. First, as a water-dispersible solid, polyacrylamides may be used in applications such as hydroseeding and canal sealing. This form slowly dissolves in water, but has a tendency to agglomerate when added too quickly or all-at-once to water. When this happens, the lumps that are formed take hours, days or weeks to dissolve in water. This slow dissolution property is used to advantage in the applications specified, but is a highly undesirable trait in situations that require quick dispersion of the polymer.

Second, water-dispersed polymers are used, which have the distinct advantage of already being dissolved. Examples of water-dispersed polymers may be found in agricultural spray deposition aids, among others. However, not much polymer can be dissolved in water—only about two percent (2%), before the solution becomes too viscous to be handled easily.

The third historical form is a traditional emulsion, more specifically, a water-in-oil (W/O) emulsion. This involves utilizing a polyacrylamide where the polyacrylamide chains are contained in small droplets of water that are dispersed in oil by using emulsifiers to help make the two phases mix. Emulsions are droplets or "bubbles" of liquid, known to those practiced in the art, as "micelles", suspended in another liquid with which the first liquid will not mix. The micelles are often called the "discontinuous phase" and the suspending liquid is called the "continuous phase."

In the case of polyacrylamide emulsions, the polymer, polyacrylamide, is dissolved in the discontinuous phase, in this case, the water phase, while the continuous phase is oil. This is known as a water-in-oil (W/O) emulsion or a reverse emulsion. This type of emulsion keeps the polymer in small packets of water, which burst open when the emulsion comes into contact with water. Polyacrylamide-based W/O emulsions disperse well in water with vigorous stirring, and are used prevalently in water treatment.

Such emulsions are also used, among other things, in pesticide tank mixtures to aid in preventing drift and increasing deposition on target species. The problems with emulsions are that they form lumps, like solid forms, when the emulsion is added to water with little or no agitation or if the water to emulsion ratio is too low. Also, emulsions are inherently unstable and will eventually break or separate into oil and water layers. The oil rises as a layer, and the water layer sinks. Since the polymer chains are now free to combine, because they are not separated by the oil "walls" (that is the oil and water separation or dividing line), they combine to form large lumps.

The polyacrylamide polymer itself comes in several types, defined by electrical charge of the polymer chain. The polyacrylamide polymer may be nonionic, anionic or cationic. The cationic form is commonly used in water treatment. In the agricultural applications, the cationic, or positively charged polymer, is rarely used, as it has a deleterious effect on aquatic wildlife. The nonionic or uncharged form is a reaction product of pure acrylamide, forming an uncharged, but water-soluble polymer that is quite inert in the environment.

Acrylamide is co-reacted with other monomers to form the cationic or anionic forms. To form the anionic polymer, acrylamide is most often reacted with an acrylate monomer that is further reacted so that it becomes negatively charged. The nonionic and anionic polymers have different properties. At lower levels in water, the anionic polymers build properties, such as viscosity, faster. Anionic polyacrylamide polymers are compatible with other charged molecules, such as are contained in fertilizers. However, they can react undesirably with certain other charged molecules. Thus, nonionic polyacrylamides are used in situations where the anionics are incompatible with other molecules.

The amount of charge is measured as a percent of the comonomer added. Thus, a polyacrylamide that is 30% acrylate and 70% acrylamide is called a 30 percent-charged polymer. This percentage may be expressed as weight or mole percent, depending on the manufacturer. Typically, if the polymer is a combination of the two monomers, the acrylic acid portion is reacted with base to form the acid salt. The polymer is then considered to be charged.

Microemulsions are a very recent, commercially available development. A microemulsion is a special type of emulsion that has the same basic structure as traditional emulsions, except that the droplets are smaller. Smaller droplets, by virtue of the solution physics involved, are very stable and the droplets do not combine or separate in solutions as traditional emulsions do. Microemulsions are also virtually clear, while sometimes having only a slight haze, as opposed to standard emulsions which are typically milky white.

Polyacrylamide microemulsions, as they are now, do have their own disadvantages, however. The prevalent disadvantage of a microemulsion is that, if it is combined with water or aqueous solutions, polyacrylamide microemulsions will tend to form a skin at the surface that drastically reduces water diffusion, such as the diffusion of oil and/or emulsifier combination into the water phase. This is due to the fact that there are very many small aqueous droplets nears the surface of the emulsion and when they are combined with water, water diffuses quickly across the discontinuous phase and swells the micelles nearest the surface. The micelles swell, combine, burst and rupture, in that order.

This instantaneous bursting of many of the droplets entangles the polymer on the surface of the microemulsion and forms a barrier, which, in turn, slows diffusion of water further into the microemulsion and dispersion of the rest of the polymer. This phenomenon, sometimes known as "skin", causes the same problems that traditional emulsions have in terms of dispersion and clean out.

Observers of microemulsions may actually observe that they are clear and therefore question the ability of the product to do the job intended or observe the presence, in this case, of polymer until the product is added to water, which causes the characteristic milky appearance and slimy feel of polyacrylamide emulsion added to water appear.

While each of the polymers and the delivery systems has distinct advantages, certain applications create great disadvantages for all polymers. For example, in agricultural fields that are watered using pivot irrigation, the polymer polyacrylamide is known to have been tested and shown to be effective at reducing the need for water. However, handling of the traditional emulsion, which is, thus far, the only economical form for this application, can plug pumps, nozzles, screens, or other apparatus, when the tedious clean out procedures necessary following application and if not done properly can lead to the lumping process described above. Microemulsions have been tested in this process and have been found to have the same problems because of the skinning described above.

Moreover, as noted, polyacrylamide requires surfactant and/or emulsions systems useful for admixing the polyacrylamide to form stable microemulsions. Specifically, a surfactant or emulsion system must be useful to effectively stabilize the aqueous discontinuous phase in oil to prevent phase separation and other like problems. The present invention provides emulsifier systems for stabilizing polyacrylamide-containing microemulsions.

Water repellant soils may cause serious issues when attempting to enhance the ability of plants to uptake water and other materials, such as fertilizers and/or pesticides. Specifically, water-repellant soils typically retard water infiltration into the soil matrix rendering the soil impervious to water penetration leading to underutilized application or misapplication moving away from the target area. Runoff of applications of fertilizers and/or pesticides, as well as soil erosion may result, especially during heavy rainfalls and/or irrigation conditions, causing fertilizers and/or pesticides to flow into water systems, such as reservoirs, lakes and rivers. Surfactants may be utilized to allow water infiltration of water-repellant soils, but many surfactants tend to burn plants or cause other like damage to plants, such as agricultural products, growing in the water-repellant soils.

Another form of water-repellant soil is so-called "crusted" soils, such as soils that have high amounts of organic matter built up on or near the surface of the soils. The crust may act as a barrier for the penetration of water, especially aqueous systems, which would be useful for providing water, fertilizers and/or pesticides to the root systems of plants.

Because it may be difficult to deliver pesticides and/or fertilizers to roots through water-repellant soils, known methods of delivering materials, such as pesticides specifically, may include boring into trees or other vegetation to deliver the useful materials. Of course, boring causes damage to trees and other vegetation, thereby weakening the trees or other vegetation.

It is generally known that ethylene oxide/propylene oxide (EO/PO) block copolymer has useful properties for wetting soils, for example, especially when used in agricultural, turf, ornamental or other compositions, especially on water repellant soils. However, EO/PO is notoriously difficult to mix into oil-containing systems.

EO/PO block copolymer has heretofore not been combined with W/O emulsions of polyacrylamide to obtain the useful properties of both the polyacrylamide (water retention) and the EO/PO block copolymers (water penetration). This is so because one would not expect EO/PO block copolymer to be useful in mixing in such a system because of its inherent incompatibility with oils. An EO/PO block copolymer is a long chain polymer made with ethylene oxide and propylene oxide portions. Thus, one would not expect EO/PO to mix well in W/O emulsions, especially due to the fact that EO/PO block copolymer hydrophobic portion, the PO block portion, is not a good lipophile or oil-loving molecule. Since, typically, emulsifiers (molecules that contain both water-loving and oil-loving portions) must contain a strong lipophile to be an effective ingredient in an emulsions or microemulsion, one of ordinary skill in the art would not look to include EO/PO block copolymer in a W/O emulsion, especially in combination with the polyacrylamide.

A need exists for compositions and methods of making the same that combine the beneficial wetting properties EO/PO block copolymer and the water retention properties of polyacrylamide. Moreover, a need exists for compositions and methods of making the same having a combination of polyacrylamide and EO/PO block copolymer in a W/O emulsion in order to deliver this combination in economically viable quantities.

Further, a need exists for compositions and methods of making the same that form stable microemulsions, combining the enhanced water carrying properties polyacrylamide and the wetting properties of EO/PO block copolymer. Still further, a need exists for compositions and methods of making the same that form stable W/O microemulsions that may be combined with water to be utilized as an additive to soils, such as water-repellant soils. Still further, a need exists to deliver the same in a combination that will not harm trees or sensitive plants such as turfgrasses.

In addition, a need exists for compositions and methods of making the same having superior wetting properties, such as in water-repellant soils and in crusted soils. Still further, a need exists for compositions and methods of making the same providing superior abilities to deliver water, pesticides, fertilizers and/or other materials to plants, such as agricultural products.

SUMMARY

Among the many objectives of the present invention is the provision of a microemulsion including both polyacrylamide and EO/PO block copolymer that disperses easily in water, does not agglomerate and is stable for long periods of time, that is then dispersed in an aqueous medium.

Another objective of the present invention is the provision of a solution for emulsion dispersion problems by using a more dilute version, in terms of polyacrylamide and EO/PO block copolymer content of the microemulsion with a set of stabilizing and dispersing ingredients that slows bursting of the bubbles into aqueous solution, thus allowing the individual bubbles to disperse into the water phase with its oil coating before bursting.

Also, an objective of the present invention is the provision of a concentrated solution rather than a water-dispersed polymer of polyacrylamide and EO/PO block copolymer.

Moreover, an objective of the present invention is the provision of an easily dispersed formula of polyacrylamide and EO/PO block copolymer.

A further objective of the present invention is the provision of an inherently stable formula of polyacrylamide and EO/PO block copolymer.

A still further objective of the present invention is the provision of polyacrylamide and EO/PO block copolymer having relative ease of hydration of the dilute polymer solution.

An additional objective of the present invention is the provision of a polyacrylamide microemulsion composition for utilization in various applications. Specifically, an objective of the present invention is the provision of a polyacrylamide microemulsion composition having enhanced handling characteristics and stability.

It is, therefore, an advantage of the present invention to provide compositions and methods of making the same that combine the beneficial properties of polyacrylamide and EO/PO block copolymer.

Moreover, it is an advantage of the present invention to provide compositions and methods of making the same having a combination of polyacrylamide and EO/PO block copolymer in a W/O emulsion.

Further, it is an advantage of the present invention to provide compositions and methods of making the same that form stable microemulsions combining the enhanced water-carrying properties of polyacrylamide and the enhanced wetting properties of EO/PO block copolymer.

Still further, it is an advantage of the present invention to provide compositions and methods of making the same that form stable W/O microemulsions that may be combined with water to form aqueous compositions useful for utilizing on soils, such as water-repellant soils.

In addition, it is an advantage of the present invention to provide compositions and methods of making the same having superior wetting properties, such as in water-repellant soils and in crusted soils.

Still further, it is an advantage of the present invention to provide compositions and methods of making the same providing superior abilities to deliver water, pesticides, fertilizers and/or other materials to plants, such as agricultural products.

These and other objectives of the invention (which other objectives become clear by consideration of the specification and claims as a whole) are met by providing an composition comprising polyacrylamide and EO/PO block copolymer as a W/O microemulsion.

DETAILED DESCRIPTION OF THE PRESENTLY PREFERRED EMBODIMENTS

The present invention comprises a mixture of a water-in-oil microemulsion with polyacrylamide and EO/PO block copolymer. Specifically, the present invention includes, dissolved in the water phase, a polyacrylamide copolymer and an EO/PO block copolymer, with the water phase mixed with an oil phase. Preferably, the present invention may further comprise the presence of at least one fatty acid and/or at least one nonionic surfactant to stabilize the microemulsion. In addition, the present invention may further comprise effective amount of other components, such as pesticides and/or fertilizers, that may be delivered to trees, plants or other vegetation.

Polyacrylamide Copolymer

The present invention comprises an effective amount of polyacrylamide copolymer in a W/O microemulsion or nanoemulsion to impart desired characteristics, especially when combined with an aqueous medium, such as water, for use thereof. Specifically, the polyacrylamide may be desired to hold and/or retain water.

Preferably, the present invention is a microemulsion compositions comprising an effective amount of polyacrylamide copolymer, generally in the form of a polyacrylamide microemulsion or nanoemulsion having, preferably, up to about fifteen percent (15%) polyacrylamide solids content, for example about two percent (2%) to about fifteen percent (15%) by weight, which may then be further diluted in water at the time of use to impart the desired characteristics of the polymer to the water phase or to the material to which the water phase is applied, as described in more detail below. More preferably, the range of polyacrylamide solids content is about one percent (1%) to about ten percent (10%) by weight. Most preferably, the range of polyacrylamide solids content is about two percent (2%) to about eight percent (8%) by weight. As should be apparent to one of ordinary skill in the art, the polyacrylamide microemulsion or nanoemulsion component may be any emulsion that imparts the effective amount of polyacrylamide solids, as described above. For example, a typical polyacrylamide emulsion useful for the present invention includes Kemira Superfloc brand polyacrylamide nanoemulsion having twenty two percent (22%) polyacrylamide copolymer solids content. However, any other polyacrylamide emulsion composition may be utilized as apparent to one of ordinary skill in the art to arrive at the desired polyacrylamide solids content.

The present invention requires less active ingredient of polyacrylamide content because the bubbles must be allowed to disperse in the water phase. Thus, as noted, compositions may be preferred having no greater than about fifteen percent (15%) by weight polyacrylamide copolymer solids, because compositions having greater than about fifteen percent (15%) by weight polyacrylamide copolymer solids may be difficult to disperse in the aqueous phase. Thus, utilizing less polyacrylamide copolymer solids during manufacturing is a way to achieve this goal. A countervailing consideration is that more polyacrylamide copolymer solids imparts more of the desired property of water retention, thus higher amounts of polyacrylamide copolymer solids, such as higher than fifteen (15%) by weight, may be desired.

Anionic polyacrylamide is particularly preferred in the present invention. Preferably, the charge of the polyacrylamides in the present invention is from zero percent (0%) to about forty percent (40%), which may be resultant because the reaction forming the polyacrylamide generally starts with about zero percent (0%) to about forty percent (40%) acrylic acid or acid salt. The polymer that may be formed with acrylic acid or an acid salt monomer is called anionic polyacrylamide because the polymer itself contains a negative charge, which is balanced by a cation, usually sodium. A polymer made with little or no acid or acid salt is considered nonionic polyacrylamide because the polymer essentially contains no charge. The range of charge disclosed herein is generally necessary to ensure compatibility of the polymer with the various types of ingredients in the tank mixes. Higher or lower charge may directly affect compatibility, as the higher charge may be generally more compatible with fertilizers, and the lower charge may be more compatible with other types of charged species that may form an insoluble salt with an anionic polymer.

The molecular weight of the polyacrylamide may be up to about thirty-five megagrams (35 Mg) per mole. More preferably, the molecular weight of the polymer may be up to about thirty megagrams (30 Mg) per mole. Most preferably, the molecular weight of the polymer may be up to about twenty five megagrams (25 Mg) per mole. The range of concentrations disclosed herein may allow for the maximum flexibility in the use of the polymer. Ultra-high molecular weight polymers build viscosity quickly and are highly stable in soil. High viscosity and high stability are, generally, two desirable properties for the microemulsions disclosed herein.

EO/PO Block Copolymer

The compositions of the present invention may contain a microemulsion of polyacrylamide in a W/O dispersion having an amount of EO/PO block copolymer. An amount of EO/PO block copolymer is included in the compositions of the present invention to impart improved water penetration, especially in hydrophobic media, such as in water repellant soils or crusted soils.

Preferably, the present invention includes compositions comprising, in addition to the above-referenced polyacrylamide solids content that aid in water retention, an effective amount of EO/PO block copolymer. Generally, an effective amount of EO/PO block copolymer may be up to about forty percent (40%) by weight. More preferably, the range of EO/PO block copolymer may be about two percent (2%) to about thirty five percent (35%) by weight. Most preferably, the range of EO/PO block copolymer may be about three percent (3%) to about thirty percent (30%) by weight.

The EO/PO block copolymer of the present invention may include the straight block polymeric glycols obtained, for example, by the addition of ethylene oxide (EO) on a condensation product of propylene oxide (PO). Reverse block copolymers, which are also acceptable for use in the present invention, may be prepared by reacting EO with itself to provide a hydrophile of designated molecular weight. PO is then added to obtain hydrophobic blocks on the outside of the molecule. Reversing the hydrophobic and hydrophilic blocks creates polymers that are similar to the regular EO/PO block copolymers, but with some important differences. While the EO/PO straight block copolymers tend to be better emulsifiers and dispersants and generally cover a broader range of molecular weights, the reverse block copolymers generally have lower foaming, greater defoaming, and reduced gelling tendencies.

The amount of polyacrylamide and EO/PO block copolymer utilized in an emulsion of the present invention may preferably be effective and economically viable. Delivering a solution that has too low polymer content may mean delivering too much water or other ineffective ingredient to a site, thereby causing shipping costs to be too high.

However, a polymer level that is too high may also be detrimental. It is well known to users that handle emulsions that adding a small amount of water to any emulsion may break the emulsion and cause it to gel. The gelling may cause a large, thick mass to form that does not dissolve easily in water and which may have to be stirred for days to dissolve completely. The lower level of polymer combined with the other elements/ingredients of the present invention may significantly reduce gelling.

Oil

The microemulsions of the present invention are W/O emulsions. Any oil may be utilized that may be effective in forming the microemulsions, as described herein. In a preferred embodiment of the present invention, the oil in the water-in-oil microemulsion is methylated soybean oil ("MSO") or soy methyl ester ("SME"), or a paraffin oil, which may be utilized to form the stable microemulsion of polyacrylamide and EO/PO block copolymer. However, any effective oil may be used in an effective amount and the invention should not be limited as disclosed herein.

For example, oils that may be used to form the stable microemulsions of the present invention may be: 1) petroleum oils, more preferably, paraffinic oils, and/or 2) naturally occurring oils such as seed oils, such as, cottonseed, canola, soybean, corn, palm kernel or coconut oil, and/or 3) derivatives of naturally occurring oils such as the methyl or ethyl esters or methylated or ethylated derivatives of the above-named oils. The methyl and/or ethyl esters of the above-named oils may be preferred for use in the composition of the present invention.

In a preferred embodiment of the present invention, a microemulsion having polyacrylamide and EO/PO block copolymer may be formed utilizing, as starting materials, a polyacrylamide nanoemulsion and an amount of EO/PO copolymer that is combined with a methylated soybean oil or paraffin oil to form a W/O microemulsion.

The oils, taken singly or in mixtures as named, herein may comprise up to about ninety percent (90%) by weight of the composition. More preferably, the oils, taken singly or in mixtures as named, herein may comprise from about twenty (20%) to about eighty percent (80%) by weight of the composition. Most preferably, the oils, taken singly or in mixtures as named, herein may comprise about thirty percent (30%) to about seventy percent (70%) by weight of the composition.

Stabilizers

For the two phases of the microemulsions of the present invention to mix or "emulsify", a set of emulsifiers may be used. Generally, emulsifiers contain two areas or regions within the molecule, one that is hydrophobic and one that is hydrophilic. This structure therefore acts as "glue" that holds the two immiscible phases together, and interconnects the two phases together by going to the interface between the two phases and bridging the two, with the hydrophobic portion sticking into or otherwise contacting the oil phase and the hydrophilic portion sticking into or otherwise contacting the aqueous phase.

The present invention may further optionally but preferably contain two specifically important ingredients. First, it may contain at least one fatty acid. Second, it may contain at least one nonionic surfactant. This combination is unique in its ability to bring the two phases together and work together to stabilize the emulsion. The one or more fatty acids and the one or more surfactants come together to form an easily water dispersible microemulsion product with fewer handling issues. The terms "surfactant" and "emulsifier" may typically be used interchangeably, since all emulsifiers are surfactants and most surfactants are emulsifiers. These terms tend to differentiate the jobs each performs rather than any structural or chemical differences between them.

The presence of the fatty acids may be preferable in terms of dispersion as the fatty acids may act as the main contributor to slowing the diffusion of water and, therefore, bursting of the micelles into the water phase when dispersed in water.

This effective use of fatty acids is surprising, because it is known that ionic surfactants do not stabilize water-in-oil (W/O) emulsions well. The book "Chemistry and Technology of the Cosmetics and Toiletries Industry", D. F. Williams, W. H. Schmitt, Second Ed., Springer, 1996, p. 31, states, "A limited number of W/O emulsifiers are available. This is because ionic emulsifiers will not generally work in the case of W/O emulsions." Since fatty acids can form, and often are used as, negatively charged species, they are generally considered ionic emulsifiers.

Preferably, the fatty acid includes at least one selected from the group consisting of $C_8$ to $C_{30}$ fatty acids. Such acids include, but are not limited to, myristic, lauric, palmitic, stearic, oleic, and linoleic acids and mixtures of fatty acids derived from natural sources such as coco, lauryl, palm, soy, cottonseed and tall oil fatty acids. Most preferably, the fatty acid includes at least one fatty acid whose major content is $C_{18}$ fatty acids such as soy and tall oil fatty acids. An effective amount of fatty acid, as described herein, may be utilized. Preferably, the fatty acid content is up to about thirty percent (30%) by weight. More preferably, the range of fatty acid content is about one percent (1%) to about twenty five percent (25%) by weight. Most preferably, the range of fatty acid content is about five percent (5%) to about twenty percent (20%) by weight.

Preferably, the nonionic surfactants include at least one surfactant selected from the group consisting of ethoxylated surfactants, nonylphenol ethoxylates or alcohol ethoxylate or other ethoxylated surfactants. Better results may be obtained with nonylphenol ethoxylates or alcohol ethoxylate surfactants. The best results may be obtained with, most preferably, alcohol ethoxylates. Preferably, the nonionic surfactant content is up to about thirty percent (30%) by weight. More preferably, the nonionic surfactant content is about one percent (1%) to about twenty five percent (25%) by weight. Most preferably, the range of nonionic surfactant content is about five percent (5%) to about twenty percent (20%) by weight.

Another surprising property of the nonionic surfactant ingredient in the present invention is the use of a nonionic surfactant or a combination of nonionic surfactants with a relatively high hydrophilic-lipophilic balance (HLB). HLB is the nature of a surfactant to have a balance between aqueous and nonaqueous phases. A low HLB surfactant has a high affinity for oily or nonaqueous phases and is generally highly insoluble in water. A high HLB value surfactant may generally have a high affinity for water and may form clear mixtures with water, even at high concentrations. Fatty acids generally have a long lipophilic chain terminated in a carboxylic acid moiety that is hydrophilic. The lipophilic portion generally dominates the molecule, however. Nonionic surfactant may generally have a carefully controlled HLB and range across the entire spectrum of HLB. Addition of the proper nonionic surfactant may allow the correct HLB value of the overall surfactant to be reached.

Preferably, a nonionic surfactant or at least one nonionic surfactant in a combination of surfactants may have an HLB greater than 9.0. More preferably, the HLB is about 9.0 to about 20. Most preferably, the HLB is about 9.3 to about 15. The present invention preferably includes a nonionic surfactant or a combination of surfactant with at least one nonionic surfactant having a higher HLB. By contrast, the fatty acids of the compositions of the present invention may preferably be very low HLB emulsifiers.

Other Components

The present invention may further include effective amounts of other components. Specifically, the present invention may act as a delivery system for effective amounts of components having a specific purpose, such as pesticides, such as insecticides, fungicides and other like pesticides, and/or fertilizers. For example, the compositions of the present invention may be useful for wetting and/or penetrating hydrophobic soils. Thus, the compositions of the present invention may be particular useful to deliver water and/or other components, such as pesticides and/or fertilizers to roots of vegetation through hydrophobic soils. Preferably, these other components may be admixed into the compositions of the present invention in their concentrated forms, prior to the addition of water. However, it should also be apparent to those of ordinary skill in the art that these other components may added after diluted with water and prior to delivery to a desired area or location, such as to hydrophobic soil.

The microemulsion may be achieved in at least two ways. A first way is to classically create the microemulsion using well-known techniques. These techniques are often employed in manufacturing microemulsions. However, the objective is almost always to create a microemulsion with the highest content of active ingredient possible. Thus, these microemulsions may classically be more than 15% polyacrylamide for economy of transport and value.

However, another way to create the microemulsion involves diluting the commercially available material with higher concentrations of oil and emulsifier. The commercially available microemulsion is relatively inexpensive compared to the cost of forcing a special reaction. Therefore, the "dilution method" of making a microemulsion in accordance with the present invention is relatively simple and inexpensive, while effectively reaching the same objectives at less cost.

The benefits of the present invention are at least two-fold. First, the microemulsions of the present invention are more stable than normal emulsions, as is generally disclosed above. Thus, long-term storage may be possible and even likely, as opposed to other emulsions, which tend to have long-term storage problems. The second benefit involves the amount of polymers and the solutions in which they are delivered.

The present invention may address the problem of the formation of microemulsion "skin" by production of a dilute, but not too dilute, and stable microemulsion. This may be accomplished, in a practical and economic sense, through dilution of the microemulsion with oil. The addition of oil may create a thicker continuous layer through which water and water droplets must pass. This may slow diffusion of water from the bulk liquid into the droplets. The micelles, therefore, may swell more slowly. Slower dispersion of the droplets at the surface of the microemulsion and slower swelling of the droplets in the microemulsion may mean that the surface skin does not form when the microemulsion comes in contact with water.

However, addition of oil to the microemulsion alone may be inadequate. If oil is added directly to a typically manufactured polyacrylamide nanoemulsion, or any other emulsion for that matter, an unstable emulsion results and a discontinuous layer may separate from the continuous layer. The addition of further ingredients, typically more emulsifier, may be necessary to ensure a stable, easily-dispersed microemulsion having polyacrylamide and EO/PO block copolymer.

The present invention addresses the potential instability by addition of emulsifiers to form stable microemulsions. These emulsifiers must balance between the water and oil phases and be compatible with the emulsifiers that may be typically used in microemulsions. However, with the addition of more oil in the case of the present invention, the balance of the emulsifiers must be adjusted to coincide with the water/oil ratio change.

Of course, the ideal amounts of each component may depend on the amounts of the other components within the compositions of the present invention. For example, the amount of fatty acids and/or surfactants needed to create stable microemulsions may vary depending on the ratio of oil to aqueous phase and also on the amount of polymer present in the aqueous phase. However, the fatty acid may not, typically, be added alone. The fatty acid may preferably be balanced with one or more surfactants to ensure compatibility with the aqueous phase.

In the present invention, the addition of one or more supplementary nonionic surfactants may be required. Probably, the most important reason for the use of additional surfactants may be that the addition of fatty acid throws off the balance between the hydrophilic and hydrophobic phases. Therefore, it may be necessary to add something that, while it may still technically be a surfactant, counteracts and/or balances the hydrophobic nature of the fatty acid. This may be accomplished in the present invention through the use of nonionic surfactants with a medium to high HLB, such as, for example, a nonionic surfactant having an HLB above about 9.3.

Thus, the proper mixture may be reached for the present invention by formation of a microemulsion with the addition of fatty acids and one or more nonionic surfactants with the levels of each carefully controlled.

The present invention may have systems whereby the amount of oil, amount and type of surfactant(s), amount of polyacrylamide copolymer and amount of EO/PO copolymer may be carefully controlled to provide an economical, easy-to-handle solution. The present invention may disperse well in water. The skinning, lumping and clumping that is a problem with other microemulsions and standard emulsions generally does not form. Yet, there is enough surfactant for the product to disperse into the water phase through a mechanism that releases the water droplets into the added water more slowly. Without being bound by theory, it is thought that the slower release may allow the polymers to disperse into the water to which it is added before other water droplets nearby in the microemulsion burst open or combine, thereby avoiding the entanglement that normally causes skinning or lumps.

Also, the present invention provides solutions that are generally clearer, in terms of appearance, than other emulsions or microemulsions. In general, microemulsions typically have a slight haziness. They can be generally viewed through easily, but do have minor, but definitive, cloudiness. The present invention may provide a solution that is crystal clear in its most stable form. The clarity may be achieved through the unique combination of ingredients that may be added beyond those that are normally present in a microemulsion.

The microemulsion of the present invention may disperse into the aqueous phase well because of the combination of oil and surfactants that surround the water droplets that may contain the polymer. If the amount and/or ratios of oil and surfactants are not correct, at least one of two things may occur.

First, if the mixture contains too much oil phase, the dispersion of polymer into the water may be slowed. Aside from this physical problem, there may also be financial consideration of utilizing too much oil phase.

Microemulsions formed with too much oil phase will not, generally, have a viscosity issue, as the aqueous solutions of polyacrylamide typically do, but will become uneconomical for the same reason that the aqueous polymer solutions will be uneconomical. There will generally be too little polyacrylamide present to be effective, and, additionally, the solution surrounding the polymer will typically be more expensive than just plain water.

Second, if enough oil is not added or the oil/emulsifier ratio is too high in the amount of emulsifier or the emulsifier is too water soluble, the micelles will swell and burst too quickly, causing problems of skinning and lumping. After the stable microemulsion is produced, the product must be able to be utilized by diluting the product in water or water-based mixtures for application. The precise amounts of the various components of the compositions of the present invention may be determined by one of ordinary skill in the art without undue experimentation.

The present invention's ability to be used properly is greatly enhanced over other solutions. The microemulsion may be added to any aqueous solution with a modicum of stirring or movement. It will disperse well, not forming lumps or clumps. The means of addition may be in the form of pouring, as into a container or tank, or by injection, as into a pipeline using a pump and check valve, or by any other means of addition apparent to one of ordinary skill in the art where the microemulsion is dispersed into an aqueous liquid.

In another embodiment of the present invention, compositions of the present invention may be spray treated onto dry carriers that may then be stored for extended periods of time. In addition, spray treating onto a dry carrier may enhance the ease of handling the compositions of the present invention. When desired for use, the dry carrier having the compositions of the present invention spray treated thereon may be combined with water to form a dispersion of the present invention for application thereof.

There are multiple uses for the present invention. The basic idea is to generally disperse the solutions of the present invention in an aqueous media when it is ready to be used.

One use is in irrigation. Solutions of the present invention may be pumped, using an injection pump or piston or other design, into a pipe carrying irrigation water to a pivot or other delivery system. Because of the superior dispersion properties of the present invention, there is no need to further treat or add other ingredients. The injection is followed directly by a water rinse. The water rinse may easily move through the pump without complications.

Another use is in an agricultural or non-agricultural spray tank mix containing pesticides. Solutions of the present invention may be added directly into the tank while the ingredients in the tank are being stirred. Again, the dispersion is generally very easy, not forming lumps or clumps.

Solutions of the present invention may also be used in pesticide tank mixes for several reasons. First, the solutions of the present invention may provide the ability to control the deposition of a pesticide to a target species. The presence of a deposition aid or drift control product will generally be required in the future to control drift in order to reduce drift of pesticides onto non-target species.

The compositions of the present invention may be added into an aqueous medium to impart the desired properties. The aqueous medium may then be used in a desired fashion. Such uses may include, but are not limited to, applying the microemulsion to at least one seed, at least one growing crop, at least one patch of bare ground, at least one roadside, at least one industrial area, at least one soil erosion area, at least one right-of-way, at least one forest area, at least one turf or other vegetation, at least one soil, at least waterway, at least one crop, at least one fertilizer, at least one water management area or various combinations thereof.

In addition, the present disclosure of the combination of polyacrylamide microemulsion in a W/O dispersion with EO/PO copolymer may be particularly useful in applications whereby wetting is required. For example, in soils having poor wettability, the compositions disclosed herein may be particularly useful for wetting of poorly wettable soils. Moreover, the compositions of the present invention may be useful for imparting anti-crusting properties, such as helping to prevent the buildup of organic material that may crust and otherwise create a barrier to water penetration.

Forming the aqueous dispersions of the present invention may be accomplished in any suitable fashion. Typical forming processes may include, but are not limited to, forcing the composition into the aqueous medium by at least one operation selected from the group consisting of stifling the aqueous medium and the composition, pumping the aqueous medium and the composition through a pipe or stifling it in a tank, pouring the composition into a tank containing the aqueous media and injecting the composition into the tank.

The following non-limiting examples are intended to illustrate the present invention without unduly limiting the scope of the present invention.

EXAMPLE 1

The following ingredients were combined to form a microemulsion concentrate:
Paraffin oil—53% (Tolex RHT 70);
Polyacrylamide nanoemulsion—30% (Superfloc E 4366, 6.6% solids)
Tall oil fatty acid—10.2% (Mead Westvaco L5D); can be substituted with pine derived oleic acid;
EO/PO reversed block copolymer—3.4% (Pluronic 10R5);
Nonylphenol ethoxylate—3.4% (NP 9.5)
The above ingredients were added to a container in the order specified above. The mixture was stirred continuously while the ingredients were added. A crystal clear, golden mixture was formed.

EXAMPLE 2

The following ingredients were combined to form a microemulsion concentrate:
Paraffin oil—34% (Tolex RHT 70);
Polyacrylamide nanoemulsion—40% (Superfloc E 4366, 8.8% solids)
Tall oil fatty acid—10.2% (Mead Westvaco L5D); can be substituted with pine derived oleic acid;
EO/PO reversed block copolymer—3.4% (Pluronic 10R5);
Nonylphenol ethoxylate—3.4% (NP 9.5)
The above ingredients were added to a container in the order specified above. The mixture was stirred continuously while the ingredients were added. A crystal clear, golden mixture was formed.

EXAMPLE 3

The following ingredients were combined to form a microemulsion concentrate:
Methylated soybean oil (MSO)—80.91%;
Polyacrylamide nanoemulsion—9.87% (Superfloc E 4916, 2.17% solids)
Tall oil fatty acid—3.08% (Mead Westvaco L5D); can be substituted with pine derived oleic acid;
Nonylphenol ethoxylate—3.07% (NP6)
EO/PO reversed block copolymer—3.07% (Pluronic L61);
The above ingredients were added to a container in the order specified above. The mixture was stirred continuously while the ingredients were added. A crystal clear, golden mixture was formed.

EXAMPLE 4

The following ingredients were combined to form a microemulsion concentrate:
Methylated soybean oil (MSO)—56.44%;
Polyacrylamide nanoemulsion—9.87% (Superfloc E 4916, 2.17% solids)
Tall oil fatty acid—1.85% (Mead Westvaco L5D); can be substituted with pine derived oleic acid;
Nonylphenol ethoxylate—1.84% (NP6)
EO/PO reversed block copolymer—30% (Pluronic L61);
The above ingredients were added to a container in the order specified above. The mixture was stirred continuously while the ingredients were added. A golden mixture with a very slight haze was formed.

EXAMPLE 5

An amount of the composition of Example 4 (65.22%) was mixed with 34.78% Xytect 2F, an insecticide (Rainbow Treecare Scientific Advancements). A viscous white liquid was formed.

EXAMPLE 6

An amount of the composition of Example 4 (1.25%) was mixed with 0.25% Xytect 2F, an insecticide (Rainbow Treecare Scientifice Advancements) and 98.5% water. A hazy, uniform solution was formed.

The present invention preferably delivers polyacrylamide, a proven deposition aid or drift control agent, in a form that is stable for long periods of time and mixes well in most tank mixes and EO/PO block copolymer for enhanced wetting properties of the composition. Moreover, the present invention delivers a combination of polyacrylamide and EO/PO block copolymer in the proper ratio for both to be effective. This combination, thus far, may be deliverable in one bottle. The present invention thus makes this combination possible. The above-described disclosure of the present invention illustrates but a few uses; the utility of the present invention is many-fold.

The present invention as described herein, taken as a whole with the abstract, specification, and claims, provides sufficient information for a person of ordinary skill in the art to practice the invention disclosed and claimed herein. Any measures necessary to practice the present invention are well within the skill of a person having ordinary skill in the art after that person has made a careful study of the present disclosure.

Because of this disclosure and solely because of this disclosure, modification of these compositions and methods may become clearer to a person of ordinary skill in the art. Such modifications are clearly covered by the present disclosure.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. An agricultural composition comprising a water-in-oil microemulsion of a discontinuous water phase containing a polyacrylamide polymer or copolymer, a continuous oil phase comprising at least one oil in which the water phase is dispersed, a fatty acid, and an ethylene oxide-propylene oxide block copolymer, wherein the agricultural composition is made by combining a nanoemulsion of the polyacrylamide polymer or copolymer with the at least one oil and the ethylene oxide-propylene oxide block copolymer, and wherein the polyacrylamide polymer or copolymer is present in a solids content between about 2% by weight and about 15% by weight of the agricultural composition.

2. The agricultural composition of claim 1 wherein the oil is selected from the group consisting of paraffinic oil, a natural oil, or a derivative of a natural oil or a combination of oils.

3. The agricultural composition of claim 2 wherein the oil is a methylated soybean oil.

4. The agricultural composition of claim 1 wherein the fatty acid is C8 to C30 fatty acid.

5. The agricultural composition of claim 1 wherein the fatty acid is selected from the group consisting of myristic acid, lauric acid, palmitic acid, stearic acid, oleic acid, linoleic acid, and mixtures thereof.

6. The agricultural composition of claim 1 further comprising:
   at least one nonionic surfactant.

7. The agricultural composition of claim 6 wherein the at least one surfactant is an ethoxylated surfactant.

8. The agricultural composition of claim 1 wherein the ethylene oxide-propylene oxide block copolymer is between about 2% by weight and about 40% by weight.

9. The agricultural composition of claim 1 wherein the oil composition is less than about 60% by weight.

10. The agricultural composition of claim 1 wherein the fatty acid content is less than about 20% by weight.

11. The agricultural composition of claim 10 wherein the fatty acid content is between about 2% by weight and about 14% by weight.

12. The agricultural composition of claim 1 further comprising:
   at least one surfactant, wherein the at least one surfactant content is less than about 20% by weight.

13. A dry carrier comprising the agricultural composition of claim 1.

14. The agricultural composition of claim 1 wherein the ethylene oxide-propylene oxide block copolymer is up to about 40% by weight, the oil content is up to about 90% by weight, and the fatty acid content is up to about 30% by weight, and wherein the agricultural composition further comprises a nonionic surfactant, wherein the nonionic surfactant content is less than about 30% by weight.

15. The agricultural composition of claim 14 wherein the oil is methylated soybean oil.

16. An aqueous composition comprising:
   water; and
   the agricultural composition as claimed in claim 1.

17. The agricultural composition of claim 1, wherein the fatty acid is a tall oil fatty acid.

18. An agricultural composition comprising a water-in-oil microemulsion, the water-in-oil microemulsion comprising:
   at least one polyacrylamide polymer and/or at least one polyacrylamide copolymer, wherein the polyacrylamide polymer and/or at least one polyacrylamide copolymer is present in a solids content between about 2% by weight and about 15% by weight of the agricultural composition;
   at least one fatty acid;
   at least one oil; and
   at least one ethylene oxide-propylene oxide block copolymer,
   wherein the agricultural composition is made by combining a nanoemulsion of the at least one polyacrylamide polymer and/or at least one polyacrylamide copolymer with the at least one oil and the ethylene oxide-propylene oxide block copolymer.

19. An agricultural composition comprising a water-in-oil microemulsion, the water-in-oil microemulsion comprising:
   1-10 weight percent of at least one polyacrylamide polymer and/or at least one polyacrylamide copolymer;
   at least one fatty acid;
   20-80 weight percent of at least one oil; and
   2-35 weight percent of at least one ethylene oxide-propylene oxide block copolymer,
   wherein the agricultural composition is made by combining a nanoemulsion of the at least one polyacrylamide polymer and/or at least one polyacrylamide copolymer with the at least one oil and the ethylene oxide-propylene oxide block copolymer.

20. The agricultural composition of claim 19 wherein the solids content of the polyacrylamide polymer and/or at least one polyacrylamide copolymer is between about 2% by weight and about 8% by weight of the agricultural composition.

21. The agricultural composition of claim 19, wherein the fatty acid is a tall oil fatty acid present in a content of about 5% to about 20% by weight of the agricultural composition.

* * * * *